Sept. 1, 1953

B. SEID ET AL 2,650,561

FLUID FLOW INDICATOR

Filed May 19, 1950

INVENTORS
BERNARD SEID
BRADFORD B. HOLMES
JACOB L. PAULY
BY

ATTORNEY

Sept. 1, 1953     B. SEID ET AL     2,650,561
FLUID FLOW INDICATOR

Filed May 19, 1950     2 Sheets-Sheet 2

INVENTORS
BERNARD SEID
BRADFORD B. HOLMES
JACOB L. PAULY

BY

ATTORNEY

Patented Sept. 1, 1953

2,650,561

UNITED STATES PATENT OFFICE 2,650,561

FLUID FLOW INDICATOR

Bernard Seid, Clifton, N. J., Bradford B. Holmes, New York, N. Y., and Jacob L. Pauly, Hackensack, N. J., assignors to Bendix Aviation Corporation, Teterboro, N. J., a corporation of Delaware Application May 19, 1950, Serial No. 163,036

8 Claims. (Cl. 116—117)

This invention generally relates to demand oxygen regulators for use by personnel of aircraft traversing high altitudes and more particularly to a novel indicator for use with such regulators for detecting the flow of oxygen therethrough.

The present invention is disclosed herein in combination with an oxygen demand regulator of the type described and claimed in copending application Serial No. 161,601 filed May 12, 1950. It is to be understood that the present invention may be utilized with devices other than those shown herein and that the instant regulator is chosen simply for purposes of illustration.

In supplying the oxygen requirements for occupants of aircraft operating at high altitudes it is essential to provide an indication as to the flow of oxygen. At the same time, the indicator must operate efficiently and immediately to warn the user when the oxygen supply fails.

The instant invention, therefore, contemplates a blinker-type indicator which utilizes a novel control diaphragm construction for effectively indicating oxygen flow conditions. The control diaphragm is so constructed as to eliminate all pressure conditions affecting the indicator except oxygen flow in the oxygen demand regulator. For example, "pressure breathing pressure," so called because at altitudes above 40,000 feet oxygen under pressure must be supplied to the occupant of aircraft in order to enable the blood to absorb oxygen in sufficient quantity to maintain life, is balanced across the control diaphram so that the indicator is only operable for oxygen flow pressure. In this manner, although both pressure breathing pressure and oxygen flow pressure are applied to the control diaphragm, only the oxygen flow pressure serves to operate the indicator.

An object of the present invention is to provide a novel blinker type flow indicator for oxygen demand regulators which efficiently operates at high altitudes to indicate conditions of oxygen flow through the regulator.

Another object of the present invention is to provide a novel blinker type flow indicator wherein a control diaphragm operates at high altitudes to detect minimum oxygen flow through an oxygen regulator to an occupant of an aircraft.

Still another object is to provide a novel oxygen flow indicator for use with an oxygen demand regulator which embodies a control diaphragm for effectively balancing out all pressures affecting the indicator and allowing only an indication of the flow of oxygen through the regulator.

The above and other objects and advantages of the present invention will appear more fully hereinafter from a consideration of the detailed description which follows, taken together with the accompanying drawings wherein one embodiment of the invention is illustrated.

In the drawings, wherein like reference characters refer to like parts throughout the several views, Fig. 1 is a cross-sectional elevational view of a fragmentary portion of an oxygen demand regulator to which the present invention is applied.

Figure 1:
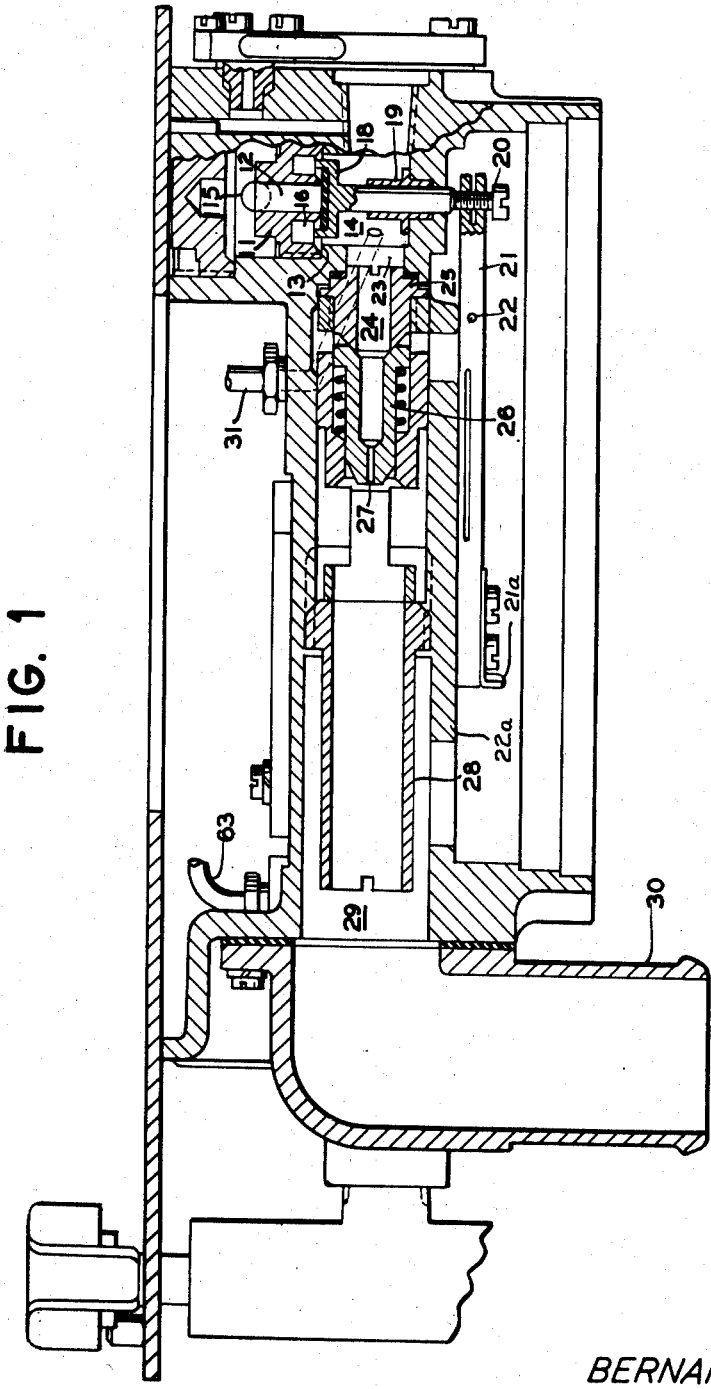
Figure 2:
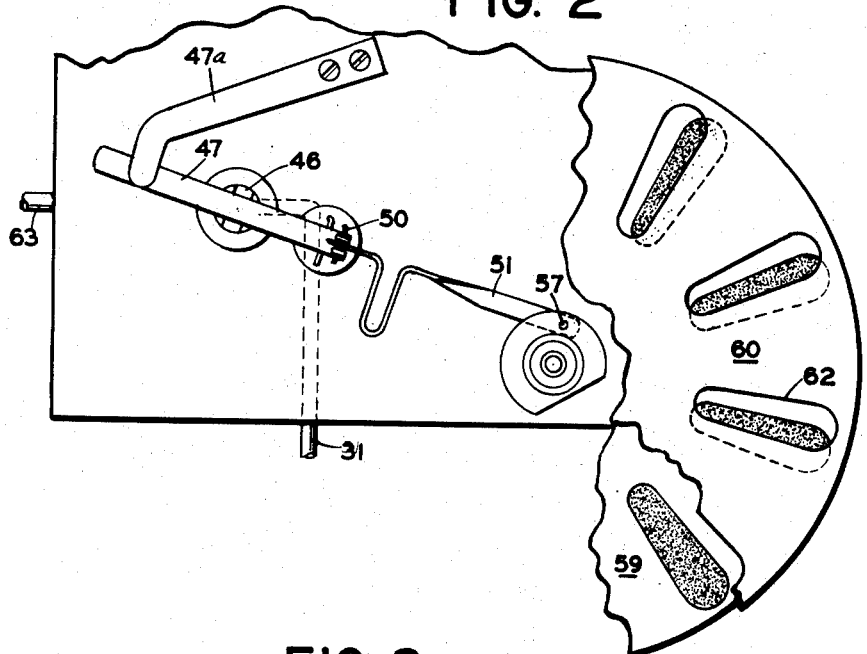
Fig. 2 is a top plan view of the subject indicator, part of the indicator face being shown broken away to afford a clearer view of the operating mechanism therefor.

Referring now to the drawings for a more detailed description of the present invention and more particularly to Fig. 1 thereof, there is illustrated in the latter a portion of the oxygen demand regulator described and claimed more fully in the above noted copending application, such regulator embodying a circular demand valve seat 11 having formed therein a centrally located bore 12. Valve seat 11 is fixedly seated on a pair of shoulders 13 formed in a demand chamber 14 which communicates with a supply of oxygen under pressure through an oxygen inlet opening 15 located at the upper portion of the chamber. A rectangular-shaped channel 16 formed in valve seat 11 is opened at its bottom end to seat a movable valve member 18 slidable in a bushing 19.

One end of bore 12 communicates with oxygen inlet 15 and is sealed at its other end by a rubber washer secured to the head of valve member 18. The foot portion of valve member 18 abuts an adjustable screw 20 fastened to one end of a lever arm 21 adapted to be pivoted about a pin 22. Pin 22 is mounted by suitable means, not shown, at one end of a substantially cylindrical housing 22a that extends across the interior of the regulator. Lever arm 21 is mounted by pin 22 so as to be angularly disposed relative to housing 22a, to the end that a clearance is provided between housing 22a and the end of lever arm 21 to which is secured a contact pin 21a. Thus, when lever arm 21 is pivoted about pin 22 in a clockwise direction, as viewed in Figure 1, the end lever arm 21 bearing contact pin 21a passes to one side, or behind, housing 22a.

The mechanism for actuating lever arm 21, and hence valve 18, forms no part of the instant invention and is fully shown and described in copending application Serial No. 60,585, filed November 17, 1948, and referred to in the aforenoted application Serial No. 161,601. For present purposes, the mechanism for actuating lever arm 21, not shown herein, includes a spring that biases lever arm 21 in a counterclockwise direction as viewed in Fig. 1, to engage screw 20 with the foot portion of valve member 18 and a respiratory responsive diaphragm that is connected through a suitable link with the contact pin 21a of lever arm 21. Actuation of the diaphragm as will be described hereinafter serves to pivot arm 21 against the spring (not shown), thereby swinging screw 20 away from the foot portion of valve member 18. The pressure of the incoming oxygen forces valve 18 to unseat, thereby allowing oxygen to flow into the lower portion of demand chamber 14.

The lower left wall of chamber 14 (as viewed in Fig. 1) is provided with an opening 23 which communicates with a circular opening 24 formed axially of a bushing 25 having a tapered end portion. The tapered end portion of bushing 25 is seated in a nozzle 26 having an orifice 27 which leads to a tube 28 concentrically disposed within a passageway 29 formed in housing 22a. An elbow 30 having secured thereto a flexible tube and an oxygen mask (not shown) is affixed to the walls of the demand regulator adjacent the passageway 29.

By reason of the construction just described, when the pilot or other occupant of the plane inhales at a mask connected to the elbow 30, the suction created within the regulator varies the pressure on the diaphragm to operate arm 21 and demand valve element 18, to initiate a flow of oxygen from chamber 14 through nozzle 26 finally through elbow 30 to the mask.

This operating condition, wherein oxygen is supplied to the mask by suction alone, is satisfactory in planes flying at altitudes up to about 40,000 feet. However, when altitudes above about 40,000 feet are reached, the blood cannot absorb oxygen at the atmospheric pressure in sufficient quantity to maintain life. Therefore, an enforced pressure is automatically built up in the demand regulator by means described in copending applications Serial No. 161,601 and Serial No. 60,585 to supply oxygen under pressure to the lungs for the altitudes noted; this pressure being the so-called "pressure breathing pressure."

Figure 4:
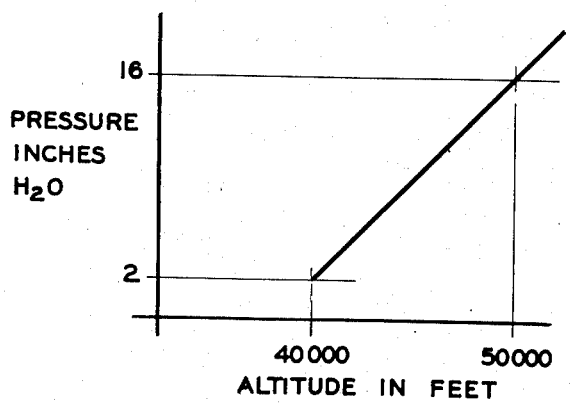
Fig. 4 is a pressure-altitude curve showing pressure breathing pressure at the various operating altitudes.

In Figure 4, a graph shows the relation between the pressure breathing pressure and the different craft operating altitudes. Altitude in feet is plotted along the axis of abscissas while the axis of ordinates bears pressure in inches of water. It is apparent from an examination of this graph that pressure breathing pressure is applied to the oxygen in increased amounts as the increases in altitude continue, reaching finally a pressure maximum of 16 inches of water for an operating altitude of 50,000 feet. In this way, at about 40,000 feet the pressure breathing pressure automatically starts to increase with altitude to aid in the breathing processes of the occupants of the plane.

As noted hereinbefore, at altitudes of 40,000 feet and above, pressure breathing pressure is initiated in the demand regulator to place the entire regulator at an internal pressure (pressure breathing pressure) to compensate for the altitude at which the craft is operating. However, when the flow of oxygen is initiated by the unseating of valve element 18, the pressure behind the orifice 27 will be greater than the internal pressure of the regulator, due to the additional pressure resulting from the flow of oxygen. Thus, while the entire regulator is at an internal pressure corresponding to the pressure breathing pressure, the area behind orifice 27 and in the lower portion of chamber 14 will effect a pressure indication higher than that present in the rest of the regulator.

Figure 3:
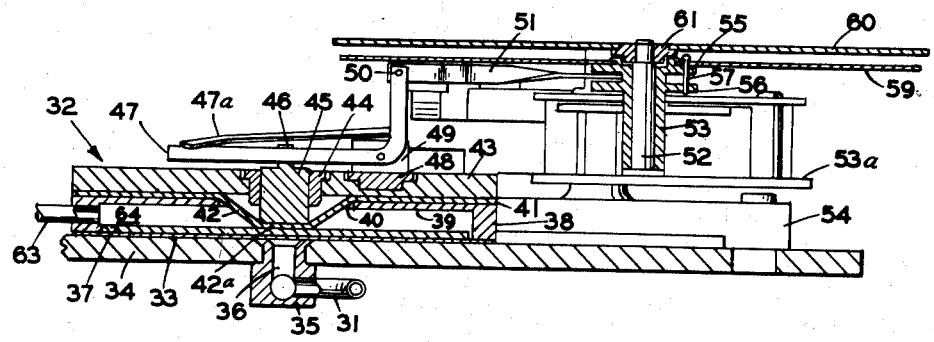
Fig. 3 is a side elevational view of the novel indicator showing in particular the control diaphragm structure for actuating the indicator operating mechanism.

Coming now to the instant invention, a tube 31 (shown broken off in Fig. 1) having one end secured to the demand regulator and communicating with the lower portion of chamber 14 is connected at its other end to the control diaphragm structure (shown in Fig. 3) generally designated by the numeral 32. The control diaphragm structure 32 embodies a flexible diaphragm 33 preferably made of rubber or the like, which is cemented on one side adjacent its peripheral edges to a support plate 34 forming part of the demand regulator. The plate 34 secures a member 35 having an opening 36 which is connected at its lower end to tube 31. The upper portion of member 35 has a flared mouth which lies and bears against the center of diaphragm 33. A plate 37 rests on the diaphragm 33 and is bounded along its peripheral edge by a flange 38 of a cover plate 39 having an aperture 40. A flexible diaphragm 41 is adhesively secured to cover plate 39 and has formed centrally thereof a depression consisting of a pair of slanting sides 42 and a horizontal side 42a which extends through the opening 40 of plate 39; side 42a bearing against plate 37.

Affixed to the diaphragm 41 by some suitable binding composition is a cover 43 which supports a bearing insert 44 centrally thereof for slidably receiving a plunger 45. The plunger 45 abuts at its bottom, side 42a of diaphragm 41 and has a channeled projection 46 formed at the top for slidably receiving a pivoted L-shaped lever 47. A flat spring member 47a bears against lever 47 to initially restrain movement of plunger 45 until a predetermined force is brought against the plunger to move it. A second insert 48 is positioned in cover 43 and has formed therewith a projection 49 which serves to provide a fulcrum for the pivoted lever 47. Thus, axial movement of the plunger 45 serves to pivot lever 47 about the projection 49.

The toe portion of L-shaped lever 47 is bifurcated and has fastened thereto by means of a pin 50 an arm 51 which has a U-shaped bend adjacent the pin for adjusting the length of the arm. The arm 51 is twisted at its other end so that it is substantially at right angles to the end fastened to pin 50. A fixed post 52 having a sleeve 53 rotatable thereon is affixed to a platform 53a secured to a bracket 54 on plate 34. Sleeve 53 is provided with a pair of integrally formed circular and parallel members 55 and 56 which have affixed thereto by a pin 57 the twisted end of arm 51. Pin 57 is located in a pair of openings in members 55 and 56 and serves also to fasten a movable circular disc or dial 59 to rotatable sleeve 53. Disc 59 is painted on one side at predetermined spaced portions with colored paint. A second disc or dial 60 located directly above disc 59 is secured at its center to a collar 61 fixed on post 52. Disc 60 is provided with a plurality of slots 62 at equal distances from the post 52 which serve to expose the painted portions of disc 59 under certain operating conditions. By means of the foregoing construction, movement of the plunger 45 rotates disc 59 with respect to fixed disc 60 through lever arm 51 to alternately expose and obstruct from view the painted portions of disc 59.

A second tube 63 (shown in Figure 1) is connected at one end to any suitable point on the demand regulator for tapping off the internal pressure or "pressure breathing pressure." The other end of tube 63 communicates with a space 64 defined by the diaphragms 33 or 41 to apply the internal regulator pressure thereto. In this manner, the existent "pressure breathing pressure" of the demand regulator is brought into the control diaphragm structure 32. Under "pressure breathing" conditions the combined pressure consisting of "pressure breathing pressure" and oxygen flow pressure is brought to bear on the underside of diaphragm 33 while the space 64 has applied therein the pressure breathing pressure.

In operating the novel flow indicator under conditions existent at altitudes of 40,000 feet and above, the pressure breathing pressure is automatically applied to the oxygen demand regulator. When the pilot or other occupant inhales at the mask, oxygen will flow through valve seat 11 and into the area behind nozzle 26. The pressure existing at that time, and behind the nozzle, is the combined pressure breathing pressure and pressure due to the flow of oxygen. This combined pressure is transmitted through tube 31 to the underside of diaphragm 33. At the same time the "pressure breathing pressure" is transmitted through tube 63 into the space 64. Under these conditions, a differential pressure is effected at diaphragm 33 consisting of the pressure due to the flow of oxygen through the area behind nozzle 26. This differential pressure exerts a force against the plunger 45 and against spring 47a to move the plunger axially. The movement of plunger 45 effects rotation of the disc 59 thereby a visual indication is brought to the attention of the user of the mask that oxygen is being applied. It is readily apparent to those skilled in the art that the pressure breathing pressure is automatically balanced out at the control diaphragm leaving only the pressure due to the oxygen flow acting to effect rotation of disc 59.

At the same time, when for some reason oxygen is not supplied to the mask, the disc 59 will not rotate because insufficient force will be applied to the plunger 45; pressure breathing pressure existing on both sides of diaphragm 33 being balanced out. The pressure on the effective area of diaphragm 41 is insufficient to move plunger 45 against the spring 47a. Thus, the user will be immediately warned of the failure of the supply of oxygen. The indicator is also operable for altitudes under 40,000 feet when there is no necessity for pressure breathing pressures, because the pressure due to the flow of oxygen will still function to operate the indicator.

The construction of diaphragm 41 is novel inasmuch as pressures in space 64 will not operate plunger 45 because the diaphragm has a very small effective area which is influenced by these pressures. This effective area consists of slanting sides 42 which bear the forces exerted by the pressure in space 64. Therefore, a very small force will be exerted upon the plunger 45 which will be insufficient to overcome the spring member 47a to effect operation of the indicator. In this manner, when pressure breathing pressure alone is applied to the space 64, and a combined pressure consisting of the pressure due to oxygen flow within the demand chamber 14 and pressure breathing pressure is applied to the underside of diaphragm 33, the plunger 45 will be actuated only by the pressure due to the oxygen flow. Since the sides 42 offer such a small effective area to the pressure breathing pressure, it is readily apparent that the dial 59 will not be rotated because the force exerted by the sides is overcome by spring member 47a.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

We claim:

1. In a fluid flow indicator, a pressure responsive member, means for subjecting one side of said pressure responsive member to a fluid flow pressure and a pressure applied to the fluid, second means for subjecting the other side of said pressure responsive member to said applied pressure alone whereby said member is actuated in response to fluid flow pressure alone, and visual means associated with said member and operable thereby for indicating the fluid flow.

2. The combination with a fluid demand regulator of the type described, of a fluid flow indicator therefor, comprising a diaphragm, first means for subjecting one side of said diaphragm to a fluid flow pressure within the regulator and pressure applied to the fluid, second means for subjecting the other side of said diaphragm to said applied pressure alone whereby said diaphragm is actuated in response to fluid flow pressure alone, and visual means adapted to be actuated by the diaphragm for indicating the presence of fluid flow within the regulator.

3. The combination with a pressurized oxygen demand regulator of the type described, of an oxygen flow indicator therefor comprising a diaphragm, first means for subjecting one side of said diaphragm to a combined pressure consisting of a pressure due to the flow of oxygen in the regulator and the pressure in the demand regulator, second means for subjecting the other side of said diaphragm to the demand regulator pressure, and visual means adapted to be actuated by the oxygen flow pressure for indicating the flow of oxygen in said regulator, the demand regulator pressure on both sides of said diaphragm being balanced out.

4. In a fluid flow indicator of the type described, a movable diaphragm, means for applying a fluid flow pressure and a pressure applied to the fluid to one side of said movable diaphragm, a second diaphragm substantially parallel to and having a portion thereof adapted to be actuated by the first diaphragm, means for applying the applied pressure to the space between both diaphragms, and visual means having an actuating means contacting the second diaphragm operated by the fluid flow pressure on said first diaphragm for indicating the presence of fluid flow in the indicator.

5. In a fluid flow indicator of the type described, a movable diaphragm, means for applying a fluid flow pressure and a pressure applied to the fluid to one side of said movable diaphragm, a second diaphragm substantially parallel to said movable diaphragm having a tapered portion adapted to be actuated by the movable diaphragm, second means for communicating said applied pressure to the space between both diaphragms, and visual means having an actuating means abutting said tapered portion of said second diaphragm adapted to be actuated by the movable diaphragm for indicating the presence of fluid flow in the indicator.

6. A fluid flow indicator comprising a movable diaphragm, a second diaphragm substantially parallel to the movable diaphragm and defining a chamber therebetween, said second diaphragm having a tapered portion which extends into the chamber and contacts the movable diaphragm, means for subjecting the chamber and movable diaphragm to equal pressures, said movable diaphragm being rendered stationary due to the balancing of pressures thereabout, and a blinker type gauge having resiliently urged operating mechanism therefor contacting a portion of said tapered portion, said tapered portion being so small in effective area that the pressure in the chamber is ineffective to overcome the force exerted by the resiliently urged operating mechanism to actuate the gauge.

7. An oxygen flow indicator for use with an oxygen demand regulator comprising a first dial having radial apertures formed therein, a second dial having spaced contrasting colored portions thereon for viewing through the apertures of the first dial, one of said dials being mounted for angular movement relative to the other dial, a yieldable wall exposed on one side thereof to both oxygen flow through the regulator as well as to a positive pressure applied to the oxygen and exposed on the opposite side thereof to the positive pressure alone whereby said wall is moved in accordance with oxygen flow alone, and a linkage transmitting movement of the wall to the movable dial.

8. An oxygen flow indicator for use with an oxygen demand regulator comprising a fixed dial having radial apertures formed therein, a movable dial mounted coaxially with the fixed dial and having spaced contrasting colored portions thereon for viewing through the apertures of the fixed dial, said movable dial being mounted for angular movement relative to the fixed dial, a yieldable wall exposed on one side thereof to both oxygen flow through the regulator as well as to a positive pressure applied to the oxygen and exposed on the opposite side thereof to the positive pressure alone whereby said wall is moved in accordance with oxygen flow alone, and a linkage transmitting movement of the wall to the movable dial.

BERNARD SEID.
BRADFORD B. HOLMES.
JACOB L. PAULY.

References Cited in the file of this patent

UNITED STATES PATENTS

| Number | Name | Date |
|---|---|---|
| 1,611,659 | Malwert | Dec. 21, 1926 |
| 2,435,181 | Lindsay | Jan. 27, 1948 |
| 2,473,922 | Tobias | June 21, 1949 |